(No Model.) 2 Sheets—Sheet 2.
W. P. FEST.
POLE ATTACHMENT FOR VEHICLES.
No. 388,189. Patented Aug. 21, 1888.
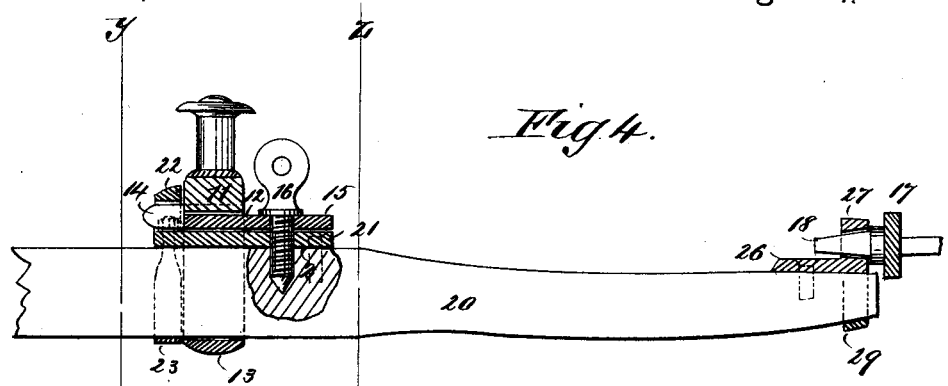
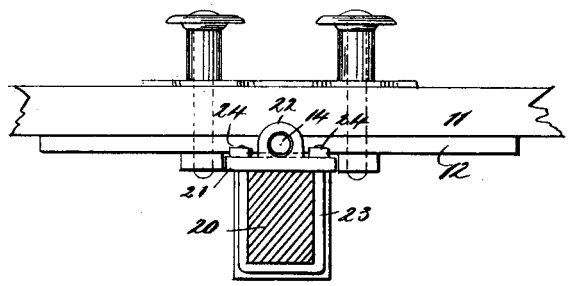
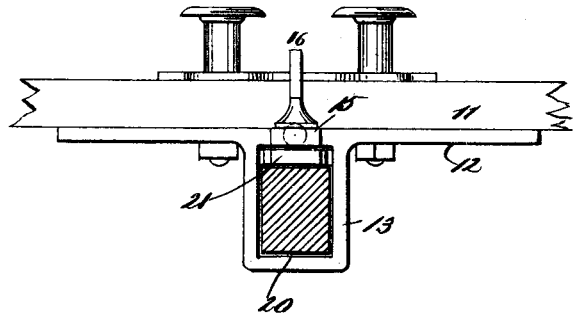
WITNESSES:
F. McArdle
C. Sedgwick
INVENTOR:
W. P. Fest
BY Munn & Co.
ATTORNEYS.

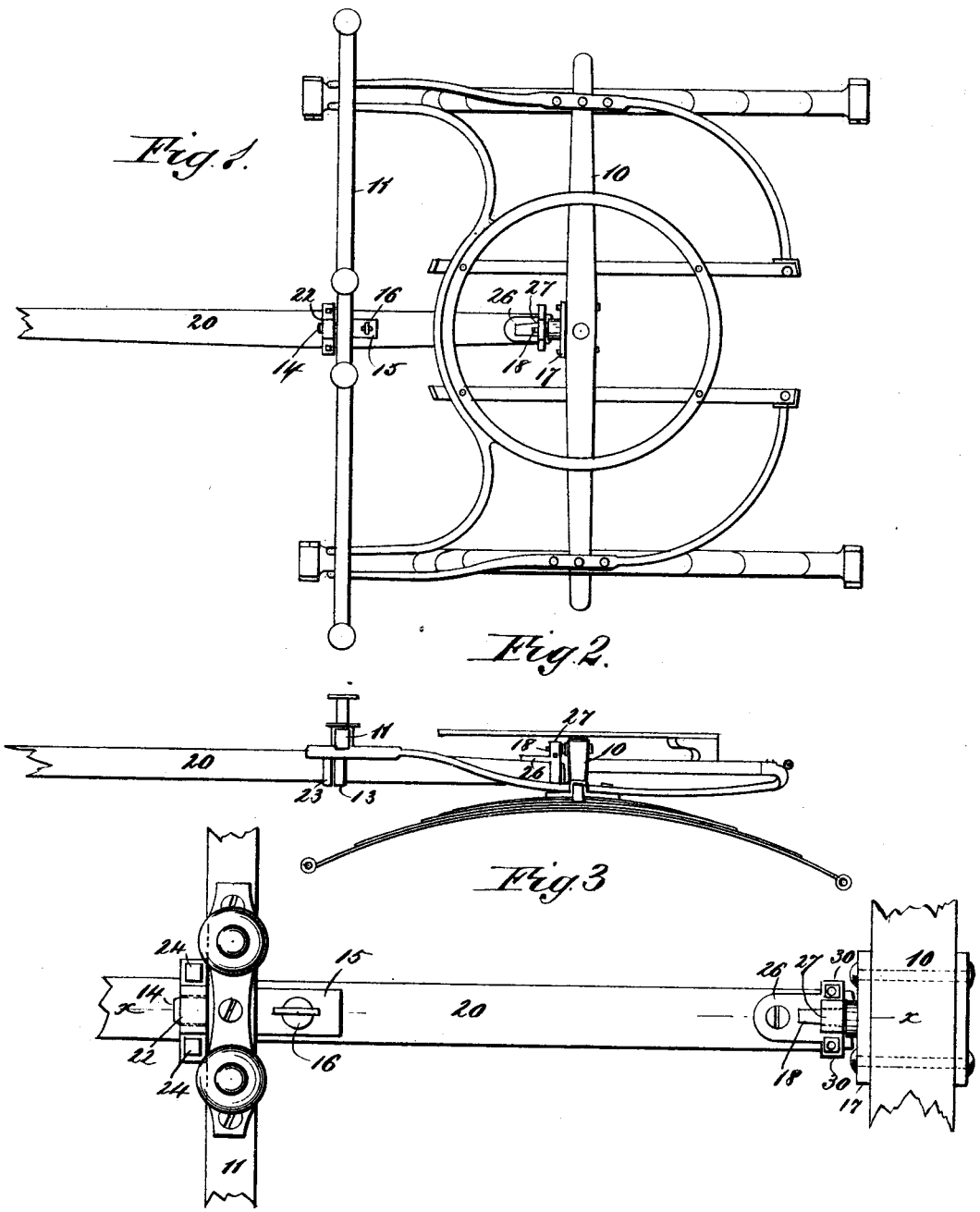

UNITED STATES PATENT OFFICE.

WILLIAM P. FEST, OF BROOKLYN, NEW YORK.

POLE ATTACHMENT FOR VEHICLES.

SPECIFICATION forming part of Letters Patent No. 388,189, dated August 21, 1888.

Application filed December 2, 1887. Serial No. 256,787. (No model.)

*To all whom it may concern:*

Be it known that I, WILLIAM P. FEST, of Brooklyn, E. D., in the county of Kings and State of New York, have invented a new and Improved Noiseless Pole Attachment, of which the following is a full, clear, and exact description.

The object of this invention is to provide for the attaching of vehicle-poles to the running-gear in a manner such that all rattling will be avoided and the fitting of the pole will be facilitated.

Reference is to be had to the accompanying drawings, forming a part of this specification, in which similar figures of reference indicate corresponding parts in all the views.

Figure 1 is a plan view of the upper forward portion of a vehicle running-gear, my improved form of pole attachment being represented as it appears when arranged in connection with the running-gear. Fig. 2 is a side view of the construction illustrated in Fig. 1. Fig. 3 is an enlarged plan view of the inner end of the pole and portions of the draw-bar and bottom-bed, the pole-attaching devices being represented in the view. Fig. 4 is a side view, in partial section, taken on line $x\,x$ of Fig. 3. Fig. 5 is a cross-sectional view taken on line $y\,y$ of Fig. 4, and Fig. 6 is a cross sectional view taken on line $z\,z$ of Fig. 4.

In the drawings, 10 represents the bottom-bed, and 11 the draw-bar, of a vehicle running-gear. To the under side of the draw-bar 11 there is connected an iron, 12, that is formed with a pole-socket, 13, a forwardly-extending dowel or spur, 14, and a rearwardly-extending projection, 15, which projection is apertured to receive a binding-screw, 16. To the bottom-bed 10, I connect an iron, 17, that is provided with a forwardly-extending dowel or spur, 18, that is preferably square or irregular in form in cross-section. To the pole 20, I connect an iron, 21, that is formed with an eye, 22, the iron being secured to the pole by a clip, 23, that is engaged by nuts 24, the arrangement being such that should the pole shrink the nuts may be turned tighter and the iron held firmly to the body of the pole. To the upper face of the rear end of the pole I connect a second iron, 26, which is also provided with an eye, said eye being shown at 27, the aperture of the eye 27 being arranged to receive the spur or dowel 18, when the parts are adjusted as represented in the drawings. The plate is connected to the pole by a clip, 29, which is provided with tightening-nuts 30.

In applying the pole the rear end is passed through the socket 13, and the spurs or dowels 14 and 18 are brought into engagement with the eyes 22 and 27, respectively. The binding-screw 16 is then turned down to engage with a threaded aperture, 2, that is formed in the plate 21, the screw serving to bind and clamp the pole in the desired position.

By such a construction as the one above described the pole may be readily attached to or removed from the vehicle, and when the pole is attached, as described, all rattling at the connections will be avoided.

Having thus described my invention, I claim as new and desire to secure by Letters Patent—

1. The combination, with a vehicle running-gear, of longitudinally-extending spurs carried thereby and a pole provided with eyes, one in advance of the other, to receive the said spurs, adapted to receive said spurs, substantially as described.

2. The combination, with a vehicle running-gear provided with forwardly-extending spurs and a rearwardly-extending projection, of a pole provided with eyes adapted to receive the spurs, and with a plate formed with a threaded aperture, and a binding-screw which passes through an aperture formed in the rearwardly-extending projection of the running-gear and engages the threaded aperture of the pole-plate, substantially as described.

3. The combination, with a pole, of plates connected thereto and formed with eyes, a plate arranged for connection with the vehicle running-gear and formed with a forwardly-extending spur and a rearwardly-extending and apertured projection, a set-screw arranged to pass through the aperture of the rearwardly-extending projection and to engage the threaded aperture formed in one of the pole-plates, and a second plate or iron, also arranged for connection with the vehicle running-gear and formed with a forwardly-extending spur or dowel arranged to enter the eye of the second pole-plate, substantially as described.

4. The combination, with a pole, of a plate, 21, a clip, 23, by which the plate is connected to the pole, an eye, 22, formed upon the plate, a second plate, 26, a clip, 29, by which the plate is connected to the pole, an eye, 27, formed upon the plate, an iron or plate, 12, arranged for connection with the draw-bar of the vehicle running-gear, a pole-socket, 13, a forwardly-extending spur or dowel, 14, and a rearwardly-extending plate, 15, a binding-screw, 16, passing through an aperture formed in the plate 15 and engaging a threaded aperture formed in the plate 21, and a plate or iron, 17, arranged for connection with the bottom-bed and formed with a forwardly-extending spur or dowel, 18, that is arranged to enter the eye 27, substantially as described.

5. In a pole attachment, the iron 12, having a pole socket, 13, a forwardly-projecting spur, 14, and a rearward extension, 15, having an aperture, substantially as set forth.

6. The combination, in a pole attachment, with the iron 12, having a pole-socket, 13, a forwardly-projecting spur, and a rearward extension, 15, having an aperture, of the pole-plate having an eye, 22, receiving said spur, and a screw-threaded aperture to register with the aperture to the said extension, and a set-screw, 16, for said apertures, substantially as set forth.

7. In a pole attachment, the combination, with the rear pole-iron, 26, having a longitudinal eye, 27, and a pole-clip, 29, of the running-gear plate 17, having a forwardly-projecting spur, 18, to enter said eye, substantially as set forth.

WILLIAM P. FEST.

Witnesses:
E. M. CLARK,
C. SEDGWICK.